Patented Oct. 13, 1942

2,298,328

UNITED STATES PATENT OFFICE 2,298,328

WATERMELON JUICE AND PROCESS FOR PREPARING SAME

Ernest Stanley Yawger, Jr., Philadelphia, Pa., assignor to Crown Can Company, Philadelphia, Pa., a corporation of Pennsylvania No Drawing. Application March 26, 1940,
Serial No. 326,067

1 Claim. (Cl. 99—155)

The present invention relates to watermelon juice, and to a process for preparing the same for packaging in commercial containers.

The principal object of the invention is to provide commercially sterile watermelon juice in commercial containers which may be stored and shipped in the ordinary channels of trade, which juice is characterized by the natural aroma and palatable flavor of watermelon, and has watermelon pulp suspended therein to give the produce the natural red appearance of hearts of watermelons. By commercial containers, I mean present-day sealed cans or bottles or any other similar types of containers adapted for use in the sanitary packaging of edible products.

Up to the time of the present invention, as far as I am aware, watermelon juice has not been successfully marketed in commercial containers. That is, it has not been widely distributed in cans or bottles, as is the case with such fruit juices as that of the orange, or with such vegetable juices as that of the tomato. The principal object of the invention is to provide for the effective packaging of watermelon juice so that it may take its place in commerce with other well-known and healthful fruit and vegetable juices.

Watermelon juice has probably not become a common product of commerce because it has not heretofore been possible to package the same in such manner that the color, aroma, and particularly the flavor of the juice, is retained, while at the same time maintaining the juice in such sterile condition that it may be shipped and stored without fermentation. Natural watermelon juice is a weakly acid product, and it has been found that to sterilize the natural juice for packaging, a temperature of approximately 240° F. is required. It has been found that to properly sterilize the juice against fermentation, a sterilizing treatment at approximately 240° F. is required for a period of about twenty minutes.

Such a temperature and time treatment as mentioned above destroys the natural color of the juice, which, of course, makes it less attractive to the public, giving the product a synthetic appearance. It likewise alters or destroys the natural flavor and aroma of the product, and when so treated, the juice is not desirably palatable.

Because of the reaction of the juice to ordinary preserving treatments, it has not been heretofore possible to process it for storage and shipment as an article of commerce.

I have found that the undesirable effects of ordinary sterilizing methods may be avoided in the case of watermelon juice, if it is converted preliminary to the sterilizing treatment, from weakly acid to a more acid product. When the juice is thus converted, the time and temperature of the sterilizing treatment may be reduced to the extent that the juice may be processed agains fermentation, but without destroying the color, aroma and flavor of the natural product.

As stated above, natural watermelon juice is a weakly acid product, having a pH above 5.0, more particularly, it has a pH of approximately 5.30. I have found that if this weakly acid product is acidified to a pH of approximately 4.0 or slightly below, it is possible to preserve the juice against fermentation, by heating it to a temperature of below 212° F. for only a few mintues. I have further found that when the juice is acidified to a pH of 4.0 or slightly below, it is possible to properly sterilize the juice by cooking it at a temperature of approximately 190° F. for a period of approximately fifteen minutes. In my process, the time of sterilization may be varied within limits depending on the temperature which is employed. A temperature of approximately 190° F. is preferred, as temperatures above this tend, to an extent, to affect the natural color, aroma and flavor of the product, although temperatures up to 212° F. provide a product having sufficient natural color, aroma and flavor to constitute a suitable product from a commercial standpoint, if the time of heat treatment is not prolonged.

To acidify the juice, I prefer to use such an organic acid as citric acid, and have successfully employed this acid in quantities of about .2% to .4% by weight of the juice. However, other weak edible organic acids, such as those consisting of the group of citric, lactic and tartaric acid, may be used, in amounts sufficient to acidify the produce to the necessary extent without making it unpalatable.

The amount of the weak organic acid which need be used, depends upon the characteristics of the particular juice being treated, the principal consideration being to obtain, before sterilization, a juice having a pH of at least 4.0. Some juices may require slightly more acid to obtain this pH, than others. Sufficient acid may be added to reach a pH of less than 4.0, but a product acidified to, for instance, a pH of 3.0, might be too sharp to the taste, or might not have a beneficial effect on the digestive system. The amount of added acid may be varied in accordance with the time and temperature of the sterilizing treatment.

Not only is the natural color and taste of the product retained when using my method, but likewise the distinctive watermelon aroma is preserved in the juice.

In carrying out the method, fresh watermelons are first cut, and the hearts are removed therefrom. By watermelon hearts, I means the red pulpy portions thereof within the hull which are normally eaten when fresh watermelons are consumed.

The watermelon hearts are then run through any conventional type of pulper, such as co-acting rotating cylinders or members which break up the pulp and remove the seeds therefrom. The crushed pulp is then passed through a finer crusher or finisher, which further breaks up the pulp into very minute pieces. The juice and pulp so treated is collected, and the resulting product is liquid in form with the fine pulp in suspension therein, the product having the characteristic red color of the watermelon. It is preferable to carry out the above steps so that there is a relatively high degree of the red pulp suspended in the liquid. Satisfactorily palatable juice has been produced by this method having from approximately .06% to .27% of the red pulp solids suspended therein, although the amount of solids may be altered with variations in the amount of acid used, and temperatures and times employed in the sterilizing treatment.

Thereafter, the weak organic acid in sufficient quantities is added to the body of the juice produced as previously described.

The acidulated juice may then be provided with small quantities of sugar or salt, as desired, to further enhance the flavor, although the addition of such seasoning may be found to be unnecessary, and may be left to the choice of the consumer.

It will be understood that the added weak organic acid, such as citric acid, not only provides permissible reduction in the time and temperature of the sterilizing treatment, but also stabilizes and maintains the natural flavor, color and aroma of the ripe watermelons in the final juice product.

The juice so treated is then placed in the well-known manner, in cans, bottles or other commercial containers, in which it is given the sterilizing treatment discussed above. After processing by my method the juice may be kept in storage for any necessary length of time without any appreciable change in color, aroma, or flavor. Watermelon juice, processed as described above, has been kept in storage for a year or more without any noticeable change in the flavor, color or aroma characteristics, and it may be so stored indefinitely, without any deterioration, if properly sealed in containers.

The addition of the weak organic acid makes possible the low temperature and time processing of the juice, which in turn permits the packaging of the juice while retaining its natural flavor, color and aroma. When a container of the watermelon juice so processed is opened, the resulting product is characterized by a high degree of suspension of a substantial amount of solids, markedly dispersed in the liquid, so that the product has a natural and attractive appearance. When the juice is poured into a glass, and even if it is left to stand for a period of some minutes, there is no appreciable "settling out" of the solids from the liquid. If any such settling does occur after an extended period of time, a mere shaking of the juice reproduces the dispersion. The product is also characterized by an agreeable natural watermelon taste and aroma.

It will be found that various changes in the precise methods disclosed herein may be made, while obtaining a satisfactory product, without departing from the invention.

I claim:

The process of preparing commercially sterile watermelon pulp-in-juice suspension from the red pulp of the watermelon, which comprises removing the red pulp from the watermelon, crushing the same to a liquid, having approximately .06% to .27% of fine red pulp solids in suspension in the juice, adding a weak organic acid in quantity of about .2% to .4% to the pulp-in-juice suspension to bring the pH thereof at least as low as substantially pH 4.0 but not as low as pH 3.0, and sterilizing the pulp-in-juice suspension at a temperature between substantially 190° F. and 212° F., whereby a final product is obtained, having the natural red color, flavor and aroma of ripe watermelon, and in which there is no appreciable setting out of the pulp solids from the liquid.

E. STANLEY YAWGER, Jr.